May 31, 1932. K. B. KILBORN 1,861,276
PNEUMATIC TIRE
Filed Dec. 26, 1931
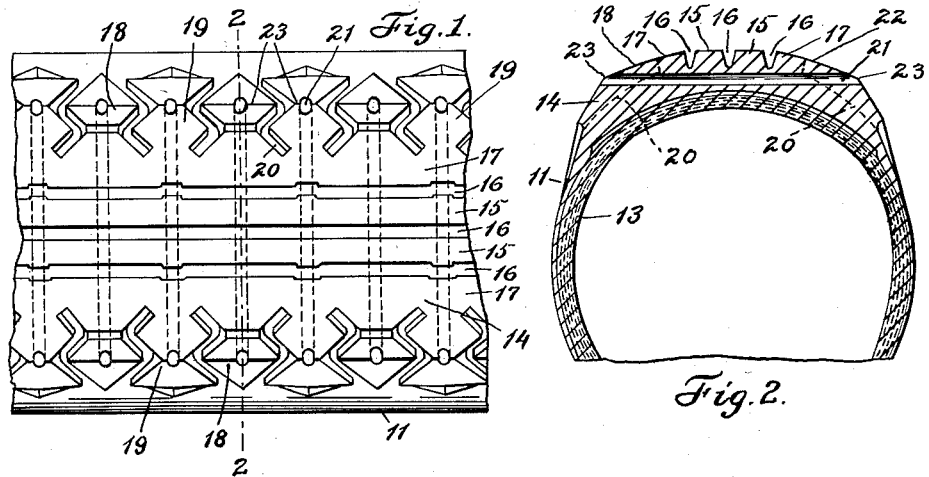
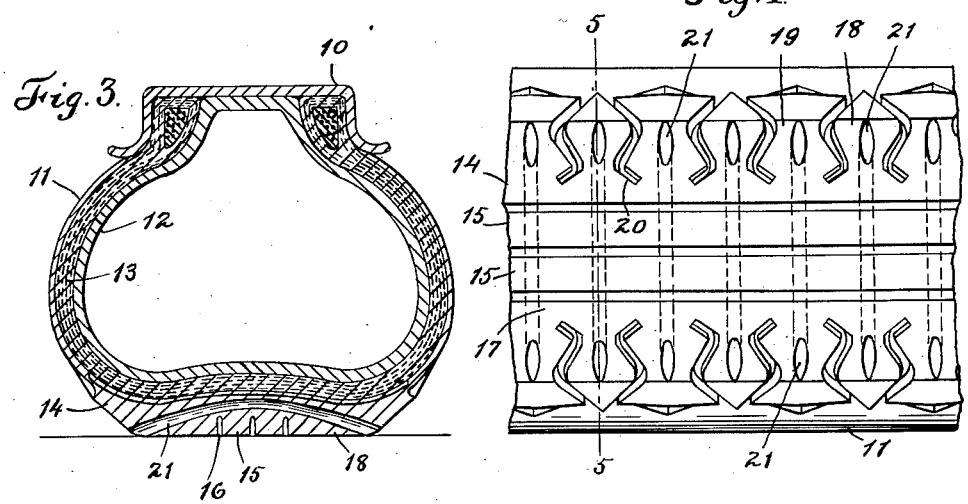
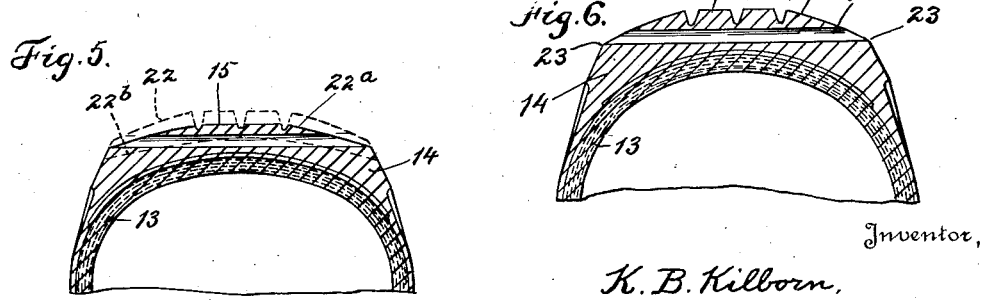
Inventor,
K. B. Kilborn.
By Robert M. Pierson,
Attorney Patented May 31, 1932

1,861,276

UNITED STATES PATENT OFFICE

KARL B. KILBORN, OF FAIRLAWN, OHIO, ASSIGNOR TO SEIBERLING RUBBER COMPANY, OF BARBERTON, OHIO, A CORPORATION OF DELAWARE

PNEUMATIC TIRE

Application filed December 26, 1931. Serial No. 583,167.

This invention relates to pneumatic tires having a laterally-apertured or perforated tread, of the general type disclosed in Krusemark Patent 1,594,102 of July 27, 1926.

The main objects of the invention are to obtain more uniform tread wear in a tire of this type having an original anti-skid tread; to develop additional extent of anti-skidding properties at the margins of the tire tread by the wearing away of said margins into the transverse apertures before the original nonskid projections in the middle of the tread have entirely worn away; to provide transverse anti-skid projections deeper in the middle than at the marginal or intermediate tread portions, from the rubber between the transverse apertures, and to develop these marginal tread-wear projections in the original marginal projections.

Of the accompanying drawings, Fig. 1 is a plan view of the tread and adjacent side portions of a pneumatic tire constructed in accordance with the present invention.

Fig. 2 is a cross section of the outer part of the tire casing on the line 2—2 of Fig. 1.

Fig. 3 is a cross section of the tire mounted on a rim, showing said tire in a flexed condition under load.

Fig. 4 is a plan view showing the condition of the tread when partly worn away.

Fig. 5 is a cross section on the line 5—5 of Fig. 4.

Fig. 6 is a cross section of a modified tread wall.

Referring to the drawings, 10 indicates a tire rim, 11 the pneumatic tire casing as a whole mounted thereon, and 12 the inner tube. 13 is the usual rubberized cord fabric carcass of the tire casing and 14 is the rubber tread vulcanized thereto and merging into the rubber side coverings of the carcass.

The original anti-skid projections molded in the tread 14 may be of any suitable form, for example, a pair of longitudinal ribs 15 occupying the middle zone of the tread and bordered by circumferential grooves 16, these ribs being preferably continuous or unbroken, although this is not essential; together with solid flanking portions 17 preferably, though not necessarily, continuous or unbroken, and marginal tread blocks or projections 18, 19 of suitable form connected at their inner ends with the flanking portions 17 and having their outer ends extended down the sides or shoulders of the tires, said marginal projections being separated in this instance by zigzag lateral recesses 20.

Within the tread 14 is formed a circumferentially-spaced series of transverse holes or apertures 21, one for each pair of opposite projections 18, 19, which apertures, for convenience of manufacture and also to develop transverse anti-skid projections in the middle as well as the marginal portions of the tread through wearing away of the tread rubber, are preferably extended in the form of straight perforations clear through the tread from one side to the other thereof, although the invention is not wholly confined to that feature. These apertures are desirably located, as shown, in planes parallel with the rolling axis of the wheel or tire, and are also themselves parallel with that axis instead of slanting in said planes, but they may be disposed in different ways.

The wearing face 22 of the tread in this case is transversely convex throughout, with its curvature increasing inwardly at the margins, as distinguished from tires of the so-called "flat" or semi-flat tread type, as it is found that this economizes in the use of rubber and also tends to produce more even tread wear both before and after wearing through into the apertures 21.

The marginal convexity of the wearing surface in the present instance is usefully combined with a novel disposition of the outer ends of the apertures 21. It will be noted that the middle portions of the apertures are located as close as possible to the outer crown of the carcass 13 in order to minimize the original tread thickness. This thickness, though subject to variation, may be substantially greater than in ordinary commercial tires of the same rated size, and corresponds more closely to the tread thickness of the so-called "de luxe" pneumatic tires. Furthermore, instead of locating the ends of the apertures 21 wholly in the side faces or shoulders of the tread 14, they are in this case carried into the wearing surface 22, being preferably located across the meeting lines or corners 23 at the junction of the wearing surface with the tread sides or shoulders, and thus terminating partly in the original wearing surface and partly in said shoulders.

Such disposition of the aperture ends avoids breaking down of the rubber by the starting of cracks in the aperture walls, it permits the progressive exposure of the end portions of the apertures from the beginning of marginal tread wear, and it obtains the benefits of the internal tread apertures without an excessive tread thickness.

It will further be observed that the bottoms of the recesses 20 which separate the marginal tread blocks or projections 18, 19, at the inner ends of said recesses are located substantially at the level of the outer sides of the apertures 21, and the bottom line of each recess extends across the level of the adjacent apertures to a point well below or radially within that level at the outer ends of the recesses. This last-mentioned arrangement provides that the tread margins may wear away into and completely through the end portions of the apertures 21 before the marginal tread blocks 18 and 19 are entirely obliterated.

In the operation of this tire, the tread affords increased cushioning for a given thickness of rubber, and is also internally ventilated by means of the perforations 21 so that the temperature of the tread wall is kept down. Fig. 3 indicates the effect of flexing of the tire against the ground under load. The contact surface of the tread flattens and the outer portions of the middle ribs 15 and the adjacent flanking portions 17 widen slightly, thus narrowing the grooves 16, while the apertures 21 assume an upwardly bowed form with their ends closely approaching or reaching the ground surface, depending upon the amount of deflection.

The bending of the wearing surface into and out of flat form produces some lateral scuffing or abrading action at the tread shoulders, and with a tread of original convex form as shown, the wear on the tread is substantially uniform throughout the width thereof. The result is that the end portions of the apertures 21 are further exposed by progressive wearing through of the marginal tread rubber into said apertures, practically from the beginning of marginal tread wear, before the middle ribs are entirely worn away and while said ribs are still effective for resisting side skid, thus developing transversely elongated openings in the wearing portions of the tread margins which have substantially the appearance indicated in Fig. 4. The intervening rubber portions at this stage constitute partial tread projections which are extremely effective in resisting longitudinal skidding tendencies, by reason of the sharp edges of the rubber and also by reason of the added flexibility of said partial projections due to the fact that they are developed in the original marginal tread blocks or projections 18, 19, separated by the recesses 20.

This semi-worn condition of the tread is indicated by the full-line wearing surface $22^a$ in Fig. 5, wherein the original or molded wearing surface is indicated by the outer or upper broken line 22. A later stage of wear is represented in this view by the inner or lower broken-line wearing surface $22^b$, at which stage the original middle tread ribs 15 have been entirely worn away and the tread has then further worn through into the apertures 21 throughout the length of the latter. The bottoms of the tread grooves 16 need not be molded down to the level of the outer sides of the apertures 21 in this case because the second non-skid formation is developed in the margins before the middle projections 15 are worn away. At this later stage, the ends of the apertures will have receded or approached each other within the tread margins, and the intervening rubber projections developed by tread wear will be higher in the middle than at the ends, although the effective transverse length of said intervening projections will not be substantially reduced until the aperture grooves have almost disappeared, because the reduction at the ends of the grooves has been compensated by development of the projections between the middle portions of the grooves.

Since the bottom lines of the marginal recesses 20 cross the level of the adjacent apertures 21 as indicated in Fig. 2, it will be evident that the marginal tread projections 18, 19, although reduced in depth by wear, will still remain effective for resisting skidding even after the middle ribs 15 have entirely disappeared, and since the intermediate projections have meanwhile developed by wearing of the tread into the apertures 21, the tread margins will have even better non-skid qualities than in the original molded tread.

It will be understood that the form of embodiment may be varied without departing from the scope of this invention as defined in the claims. For example, in the modification illustrated in Fig. 6, the termination of the apertures 21 at their two ends is wholly in the original wearing surface 22 of the tread, outwardly of the meeting lines 23 between said wearing surface and the side shoulders.

I claim:

1. A pneumatic tire casing having a flexible tread wall provided with a rubber tread internally apertured and formed with middle and marginal anti-skid projections having an original wearing contour and relation of said contour to the apertures for developing additional extent of anti-skid projections transversely in the tread margins by wearing away of the latter into the apertures before the original middle projections have worn away.

2. A pneumatic tire having a rubber tread internally formed with lateral apertures terminating substantially in the original ground-contacting surface of said tread and adapted to increase the extent of the tread projections transversely of the tread between the apertures by wearing away of the tread into said apertures.

3. A pneumatic tire casing having a flexible tread wall including a tread formed with an original convex wearing surface, said tread being also formed with internal transverse apertures terminating substantially in the outer marginal portions of said wearing surface so that their ends may be brought against the ground by flexing of the tire wall under load.

4. A pneumatic tire having a flexible tread wall including a rubber tread having marginal anti-skid projections and an original convex wearing surface, said tread being formed with transverse apertures terminating in the original wearing surface of said marginal projections and adapted to be progressively exposed by wearing away of the rubber over the end portions of the apertures from the beginning of marginal tread-face wear of the projections.

5. A pneumatic tire casing having a rubber tread with a wearing surface of convex transverse contour and side shoulders, said tread being formed with transverse internal apertures terminating substantially across the original meeting lines of said wearing face and side shoulders.

6. A pneumatic tire casing whose rubber tread is formed with original anti-skid projections having collectively a convex ground-contacting face and including marginal projections with side-shoulder faces, and intervening transverse recesses, said tread being formed, in said marginal projections, with circumferentially-spaced, internal, transverse apertures crossing the level of the adjacent recesses and terminating across the meeting lines between the ground-contacting and side-shoulder faces of the marginal projections.

7. A pneumatic tire casing having a rubber tread formed with original middle and circumferentially-spaced marginal anti-skid projections and with transverse internal apertures terminating in the original wearing faces of the marginal projections, substantially at the outer edges of the latter, the tread having a convex transverse contour shaped to cause wearing away of the marginal projections into said apertures before the middle projections have entirely worn away.

8. A pneumatic tire casing having a rubber tread with an original wearing face of convex transverse contour, said tread being formed with longitudinal anti-skid ribs separated by longitudinal grooves in the middle zone thereof and with transverse internal through apertures underlying said ribs entirely below the level of the bottoms of the grooves and underlying the marginal tread portions on both sides of the ribs, the end portions of the apertures being so disposed in the marginal tread portions that they will be progressively exposed at the ground-contacting surface by wearing away of said marginal portions before said ribs are entirely worn away.

In witness whereof I have hereunto set my hand this 21st day of December, 1931.

KARL B. KILBORN.